A. CHURCHILL.
Harvester.
No 2,007.
4 Sheets—Sheet 1.
Patented March 16, 1841.
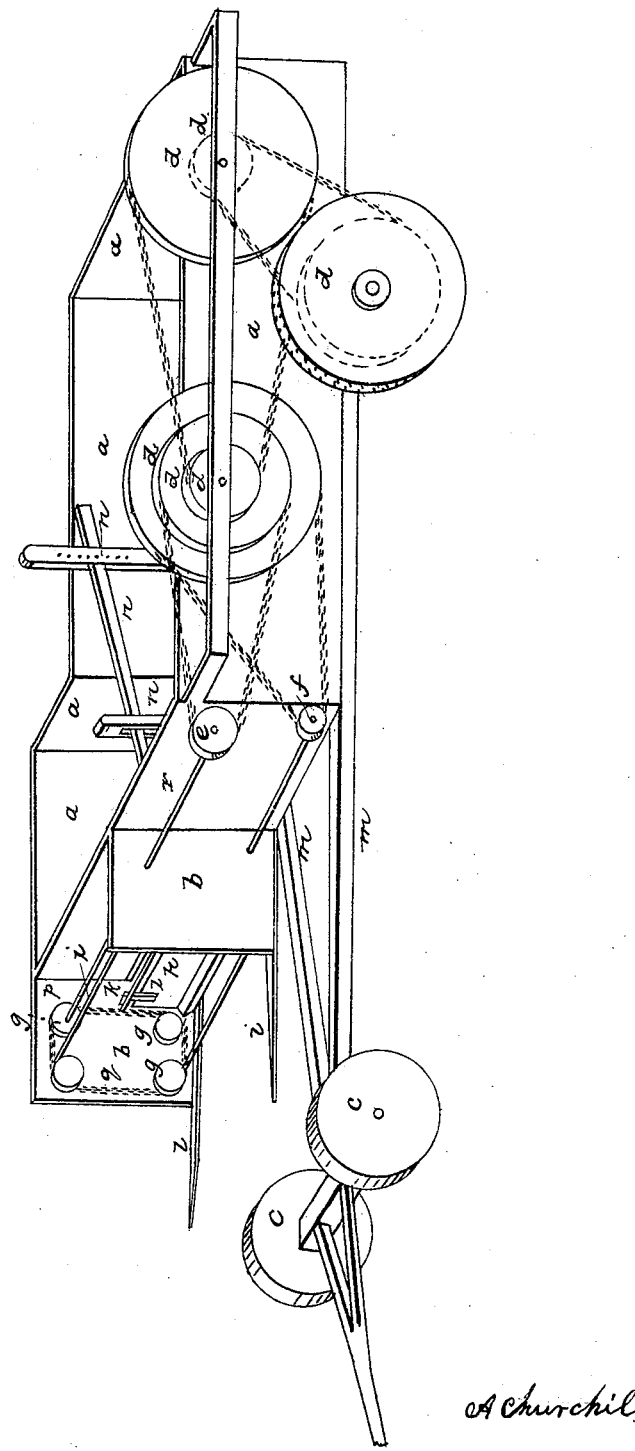
A Churchill A. CHURCHILL.
Harvester.
No 2,007.
4 Sheets—Sheet 2.
Patented March 16, 1841.
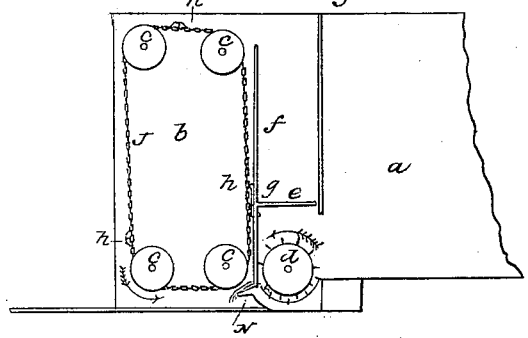
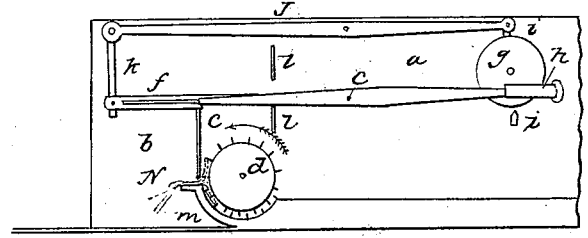
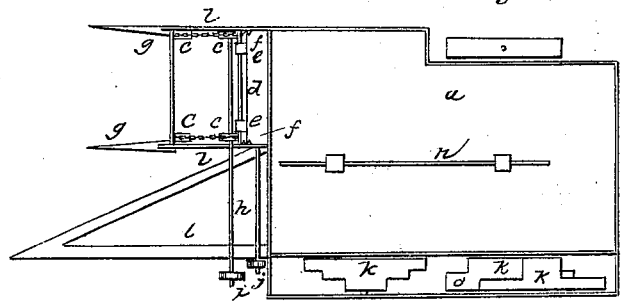
Inventor
A Churchill A. CHURCHILL.
Harvester.

Patented March 16, 1841.

Inventor
A. Churchill

A. CHURCHILL.
Harvester.
No 2,007.
4 Sheets—Sheet 4.
Patented March 16, 1841.
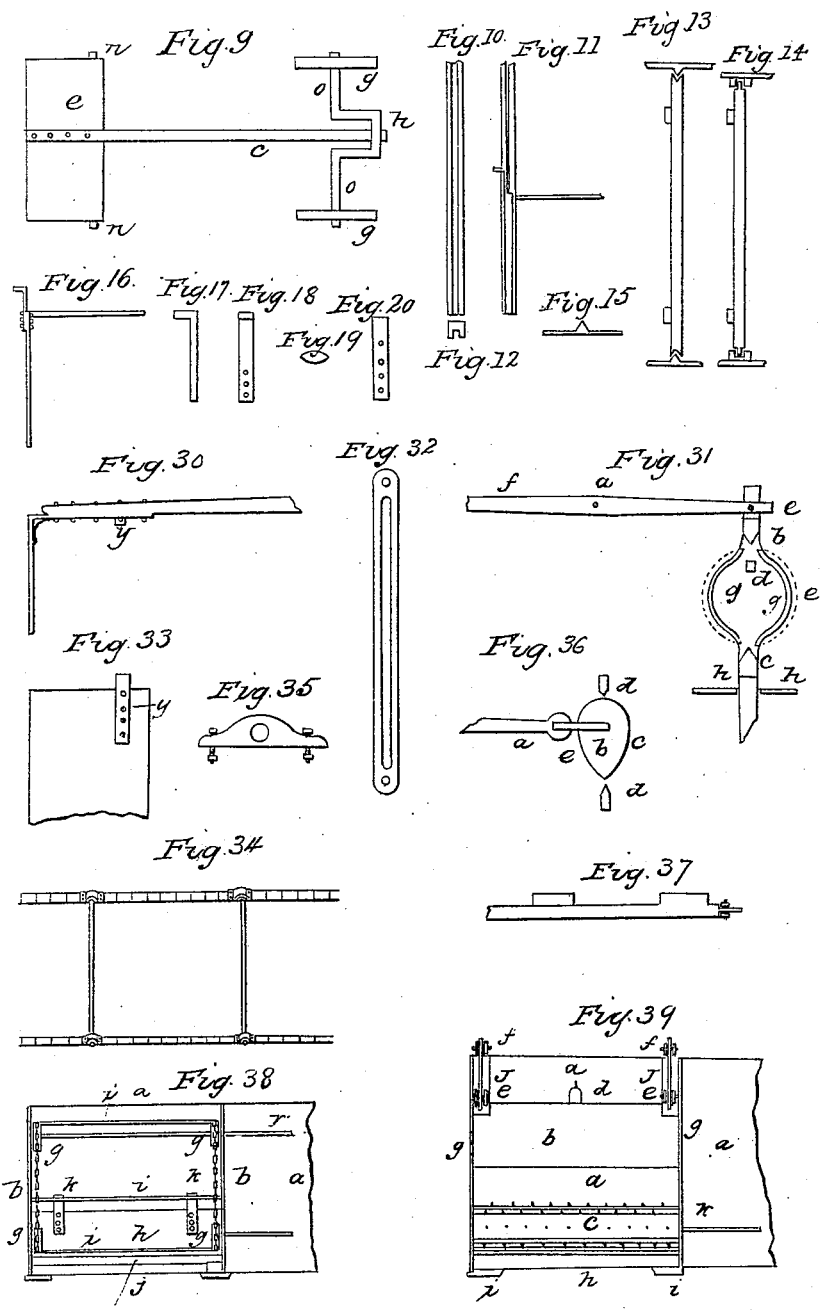
Inventor
A. Churchill

UNITED STATES PATENT OFFICE.

ALFRED CHURCHILL, OF GENEVA, ILLINOIS.

IMPROVEMENT IN THE MODE OF HARVESTING GRAIN.

Specification forming part of Letters Patent No. 2,007, dated March 16, 1841.

*To all whom it may concern:*

Be it known that I, ALFRED CHURCHILL, of Geneva, in the county of Kane and State of Illinois, have invented a new and Improved Mode of Harvesting; and I do hereby declare that the following is a full and exact description.

The nature of my invention consists in thrashing and saving all kinds of small grain when standing in the field without cutting the straw.

To enable others skilled in the art to make and use my invention, I will proceed to describe a combination of machinery to perform the operation.

I construct the thrashing part of my machine similar to the thrashing part of a common thrashing-machine and get the power from one of the hind wheels of the carriage $c$, Figure 1, upon which the machine is placed. The cylinder $d$, Fig. 2, which thrashes the grain, is placed at one side of the front end of the frame or grain-box $a$ $a$, Fig. 1, of the machine, so as to allow the team that moves the machine to travel by the side of the grain upon which the thrasher is to operate. The forward wheels $c$ $c$, Fig. 1, are of narrow track and a few feet in front of the opposite corner of the box to which the thrashing-cylinder is attached and connected to the hind wheels by coupling-bars $m$ $m$, Fig. 1, on which the front end of the grain-box rests. I attach also to the machine what I call a "gatherer." Its place of action is in front of the cylinder. It serves to gather the grain to the thrasher, and raise the cap which covers the cylinder and grain while thrashing.

One kind of gatherer may be constructed by erecting at each end of the cylinder $d$, Fig. 2, and projecting a sufficient distance forward and of a sufficient height, sides or supports $b$, Fig. 2, on the inner sides of which are fixed to each four small wheels, $c$ $c$ $c$ $c$, Fig. 2, or, pulleys at proper distances—two at or near the top and two near the bottom of each support or side piece, $b$. The two at the top nearest the cylinder $d$ have a shaft or rod, $r$, Fig. 1, passing through them, to which they are attached, which shaft and wheels are made to revolve by the power obtained from one of the hind wheels of the carriage. A chain belt, J, Fig. 2, is put round the four wheels thus arranged on each side. To each of these chain belts are attached the ends of rods $h$ $h$ $h$, Fig. 2, which extend from one chain to the other at such distances from each other that when one rod is at the cylinder $d$, Fig. 2, the next above it shall be at the upper wheel, so that while the rod $a$ is gathering the grain to the cylinder $b$, Fig. 7, the rod $c$, Fig. 7, preceding, may raise the cap $e$, Fig. 7, to a sufficient height for the grain $d$, Fig. 7, to pass under and be dropped as the rod $c$, Fig. 7, passes forward over the upper pulleys $f$, Fig. 7. Another form may be constructed by attaching the cap $e$, Fig. 4, to proper machinery to raise it, move it forward, let it descend into the grain, and then draw it back to the thrasher $d$ $m$, Fig. 4, bending the straw N, Fig. 4, over the edge of the concave $n$, Fig. 4, down to the cylinder $d$, Fig. 4, and covering it while the grain N, Fig. 4, is thrashed out; but the modes of gathering are so numerous, and your petitioner, believing it to be unnecessary, will not attempt to describe all of them. The cap $c$, Fig. 2, of the cylinder $d$, Fig. 2, may be made of any convenient form to cover the cylinder $d$, Fig. 2, while the grain is thrashed, and at the same time so that it will assist to bend the straw N, Fig. 2, over the edge of the concave down to the cylinder $d$, Fig. 2, that the grain may be thrashed out, and at the ends fitted to grooves or guides $f$, Fig. 2, attached to the sides $b$, Fig. 2, or supports of the gatherer, and hooks $g$, Fig. 2, may be attached to the front of cap $e$, Fig. 2, so that the gathering-rods $h$, Fig. 2, may raise it and drop it at the proper time, which is when the succeeding rod has brought the grain N, Fig. 2, to the thrasher $i$ and $d$, Fig. 2. The concave or apron of the thrasher is placed, as usual, under the cylinder, and raised about one-third of the circle up in front, and projects sufficiently forward and under the gatherer, as at $i$, Fig. 2, to enable the gathering-rods $h$, Fig. 2, to break the grain N, Fig. 2, down upon the cylinder. Under and attached to the lower edge of the sides or supports of the gatherer are dividing-bars $i$, Fig. 2, of sufficient width to divide the grain so that the gatherer may receive it, which project forward of the sides and terminate in a point. The carriage-wheel in the rear of the cylinder or thrasher is placed in a recess of the grain-box $a$, Fig. 5, so as to track where the grain is harvested. The other hind wheel of the carriage is placed nearly in a direct line of the draft of the team, from which I prefer to take the power to propel the other machinery.

The forward end of the grain-box thrasher, gatherer, &c., should be so arranged that it may be raised and lowered to suit the height of the grain, all of which is represented in the accompanying drawings, of which—

Fig. 1 is a perspective view. The parts by letters are: *a a a a a a* is a box for receiving the grain; *b b*, sides and supports of the gatherer; *c c c*, carriage-wheels; *d d d d*, wheels for propelling the thrashing-cylinder and gatherer, connected by chain belts, or cog-gearing may be used; *e*, wheel and rod to move the gatherer; *f*, wheel and rod to move the thrashing-cylinder; *g g g g*, wheels which move, and on which the gathering-chains move; *h*, cap to cylinder; *i i i*, gathering-rods; *j*, concave or apron of thrasher; *k*, hook by which the gathering-rods raise the cap; *l l*, bars to divide the grain; *m m*, connecting-bars; *n n n*, standards and lever to raise and lower the forward end of machine; *p*, guide to the cap; *q*, gathering-chain; *r*, rod passing through gathering-pulleys.

Fig. 2 is a sectional view. The parts by the letters are: *a* is the side of the box; *b*, sides and supports of gatherer; *c c c c*, wheels of the gatherer; *d*, thrashing-cylinder; *e*, cap of cylinder; *f*, guide of the cap; *g*, hook by which the cap is raised; *h h h*, gathering-rods; *i*, concave or apron; *j*, gathering-chain; *l*, dividing bars; N, grain or straw bent to thrasher.

Fig. 4 is a sectional view of another gatherer: *a*, side of box; *b*, side and support of gatherer; *c*, bar by which gatherer is moved; *d*, cylinder; *e*, gatherer; *f*, movable guide, in the groove of which a pin attached to the gatherer slides; N, grain bent to thrasher; *g*, eccentric-wheel attached to the crank-shaft *h*, which moves the points *i i* up and down, which are attached to the lever *j*, which is connected by *k* to the movable guide *f*; *l l*, bars to confine the end of box. The back and forward motion is made by the crank *h*.

Fig. 5 is a ground-plot of the machine: *a*, grain-box; *b b*, sides and support of gatherer; *c c c c*, wheels of gathering-chains; *d*, cap; *e e*, hooks; *f f*, guides; *g g*, dividing-bars; *h*, rod, and *i* wheel to move gatherer; *j*, wheel and rod to move cylinder; *k k k*, wheels to propel cylinder and gatherer; *l l*, connecting-bars; *m*, support to machinery; *o o*, carriage-wheels.

On the carriage-wheel that propels the machinery may be affixed spikes or teeth or other thing to prevent it from sliding.

The back part of the grain-box may be hung on hinges to be let down, with proper side pieces attached to unload conveniently.

Another modification of form and action of the cap, so as to make of it the "cap-gatherer," may be constructed by attaching to the cap *e*, Fig. 4, an arm, *c*, which is connected with and moved by the crank *h*, which crank, when in motion, gives the cap a forward and backward motion. To the shaft of the crank *o o*, Fig. 9, may be attached eccentric-wheels *g*, Figs. 4 and 8, which, when in motion, raise and lower the guides *f* of the cap by means of the lever J and points *i i*, which are connected with the lever J. The guides of the cap, *f*, are made so as to receive the points or pivots *n n*, Fig. 9, in a groove or slot in which the points move when the cap is in motion. The eccentric-wheels should be made of such form that the cap may be raised while it is moved forward by the crank, and descend nearly in a perpendicular line when the crank has driven the cap to its greatest extent forward, and let the cap remain in that position until it is drawn back by the crank to the thrasher *m d*, Figs. 4 and 8. The crank shaft *o o*, Fig. 9, may pass through the grain box and be connected with the other machinery with such convenient gearing as will give it the requisite motion; or any other machinery may be used that will give the cap the requisite motion, oscillating or revolving, to constitute it a gatherer.

Figure 8:
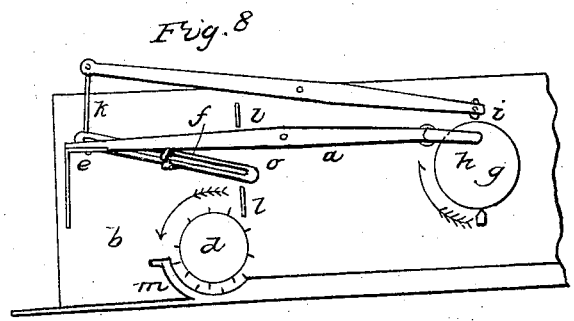

Fig. 8 is the same as Fig. 4, with the cap *e* raised, showing the guide *f*.

Fig. 9 represents the top of the cap *e* as attached to the arm *c*, in connection with the crank *h* and eccentric-wheels *g g*, connected with the crank-shaft *o o* and the points or pivots *n n*.

Figure 6:
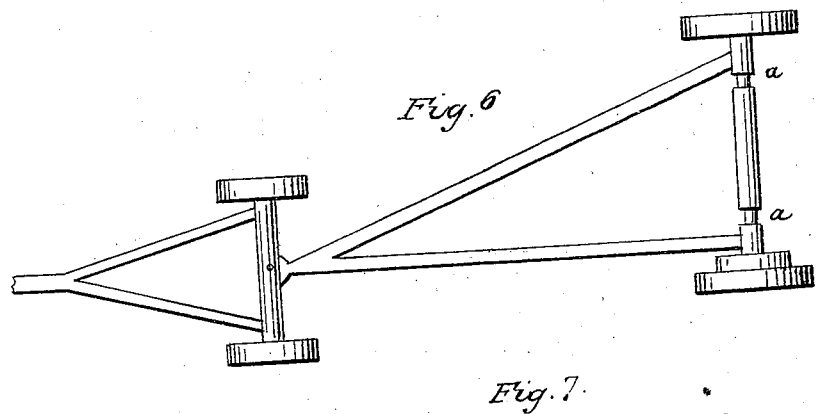
Fig. 6 is a ground-plot of carriage at *a a*. The axle is rounded to fit clasps which confine the box and carriage together.
Figure 7:
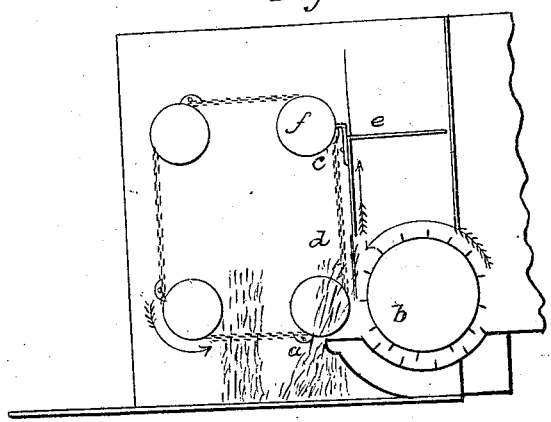

To guide the cap and keep it in its proper place of action, a groove may be made in the end of the front piece of the cap, as at Fig. 13, and the guide an angular rib or tongue-piece attached to the sides or supports of gatherer, as represented at Figs. 13 and 15, (also see Fig. 7,) or by attaching to the sides or supports of gatherer a piece of firm wood or metal, in which is formed a groove, as represented by Figs. 10, 11, 12, and the ends of the caps fitted to said grooves, as at Fig. 14. The hooks must be made of metal of sufficient strength to raise the weight of the cap by a quick motion, and attached to the cap by bolts and screws or rivets. The upper part is turned at a right angle with the part attached to the cap. (See Figs. 16, 17, and 18.) I should also say that for the purpose of shortening the length of the gathering-chain the hook may be attached to the cap lower down than represented by Fig. 16, for the place of attaching the hooks in that respect depends entirely upon the perpendicular length of gathering chain and the distance to which the cap is to be raised.

Fig. 34 represents a part of gathering-chains in connection with the gathering-rods. The rods are connected to the chains by a knob made of metal of the length and width of one of the blank links, to which it is attached by screws or rivets at each end. Through the center, in the contrary direction of the screws, is made a hole to receive the rod, where it should be properly confined by a pin through the knob or screw on the end. (Knob represented by Fig. 35.)

To construct the cap as used with the revolving rods, the front is a plane surface, with hooks and grooves, as described, the perpendicular height from one and a half to two feet, less or more, according to the size of the cylinder. That part that covers the top of the cylinder should be of sufficient width to cover the whole of the space from front of the cap to the grain-box, and may be made either plane or concave, to fit the shape of cylinder; or the top part of gatherer may be made stationary by confining the ends to the sides or supports of gatherer, in which case it will be necessary to place it sufficiently high to allow of the grain passing under it, when the grain is gathered to the cylinder, which will be about two feet. The cap, after being raised by means of the gathering-rods and the hooks attached, as the rod moves forward over the pulleys, leaves the hooks, and the cap descends by its own gravitation, by which and its accelerated motion it strikes the grain with sufficient momentum to break the grain down upon the cylinder after being bent over the edge of the concave by the gathering-rods. It is necessary that the front part of the cap should be made of some heavy material, as wood and iron, or iron alone.

To further elucidate and describe the modified form and action of the cap: Believing that the motion caused by the crank has been sufficiently explained, I will only refer to the motion and effect of the eccentric-wheels. The size and eccentricity are not material, as the motion caused by them can be varied by moving the fulcrum $a$, Fig. 31, nearer to or farther from $e$, and it may also be varied to give the cap a greater or less elevation, to suit the state of the grain—i. e., if some should be short and some long at the same place, rendering it necessary to strike deeper into the grain. The center of motion, and also the crank-shaft, is $d$, Fig. 31, the eccentric-wheel $c$, dotted line. When the side of the wheel that extends farthest from the center of motion descends, it presses upon $c$ and causes it to descend, as represented. Continue the motion, and the wheel presses upon $b$ and drives it up, these points being connected with the lever $e f$ by the circular bars $g g$, and the lever being confined by the fulcrum $a$, when $e$ rises $f$ must necessarily descend, and vice versa, the end of the lever $f$ being connected by a rod, $k$, Fig. 8, to a guide, $f$, Fig. 8, which guide is confined at the opposite end by a bolt, $o$, Fig. 8. The ends of the lever and guide thus connected necessarily have equal motion. The guide may be made of either hard wood or metal, or a combination of both, of sufficient width and thickness to give it strength, and at the same time to admit of a groove or slot being cut in the center of the width nearly from end to end. The length of the groove is determined by the length of the crank, and the guide must be so much longer than the slot as is necessary to admit of its being properly connected, as described above.

The length of the crank is determined by the motion that is given to it, as the quicker the motion is the shorter should be the gathers or strokes of the gatherer or cap, and a slow motion requires long gathers, and all should be so arranged that the grain may be gathered as fast as the machine comes to it when in motion, and as the motion is derived from one of the wheels of the carriage, the team or moving power moving fast or slow will make no difference in this arrangement.

The points that move in the slot of the guide should be made of metal. That part which is inserted into the slot is of elliptic form, as at Fig. 19; that part flat which is attached to the cap, with bolt-holes, as at Fig. 20. The connection with the cap is by screw-bolts near the back part of the top of cap, as at $y$, Figs. 30 and 33.

The form of the eccentric-wheels is nearly that of a heart, the circle that forms the side that is in front when the point is down being of greater diameter than the opposite, as at Fig. 36. Fig. 10 is a groove-guide to cap; Fig. 11, same, with end view of cap; Fig. 12, end view of groove-guide; Fig. 13, front of cap used with rib-guide; Fig. 14, same, with groove-guide; Fig. 15, rib-guide, as attached to side of gatherer; Fig. 16, end view of cap with a hook attached; Figs. 17 and 18, different views of hook; Fig. 19, end view of point in modified form, and action of cap; Fig. 20, extended view; Fig. 30, end view of cap and section of arm; Fig. 31, $f e$, section of lever; $a$, fulcrum; $b c$, points; $c$ dotted circle, eccentric-wheel; $g g$, circular bars to connect the points $b$ and $c$; $d$, center of motion and crank-shaft; $h h$, fixtures to keep the points in their proper place, should inclose the lower part of the bar, so that it may move up and down through it; Fig. 32, guide representing slot; Fig. 33, section of cap, under side, showing the connection of the point or pivot; Fig. 37, side view of bar to which the points used with eccentric-wheel are connected, and end view of lever showing the connection. Fig. 34 and 35 have been referred to; Fig. 36, the shape of eccentric-wheel; $a$, section of arm; $b$, crank; $d d$, points; $c c$, wheel, all in the position that they should stand when the cap is raised and at its greatest extent forward.

Fig. 38 is front view of the revolving-rod gatherer. The parts by the letters: $a a$, section of grain-box; $b b$, sides or supports of the gatherer; $g g g g$, pulleys for the chain; $i i i$, gathering-rods; J, front edge of concave; $k k$, hooks; $r$, shaft of the driving-pulleys; $z$, shaft of cylinder; $l l$, dividing-bars; $y y$, chains.

Fig. 39: $a a a$ is section of grain-box; $b$, cap; $c$, cylinder; $d$, arm which moves the cap by means of a crank; $f f$, levers that raise the guides; $e e$, guides; $g g$, sides of gatherers; $h$, front edge of concave; $i i$, dividing-bars; J J, rods connecting lever and guides; $k$, shaft of cylinder. This figure represents the front view of the modified form and action of the cap with the cap raised, as in Fig. 8.

In the construction of the revolving-rod gatherer, the construction of the small wheels or pulleys upon which the chains act, and which act upon the chains, may be varied to suit the chain used, and also the mode of confining the ends of the rods may be varied to suit the form of the chain, as the form of the chain is immaterial, provided the other machinery is adapted to it. In the modified form and action of the cap two guides are required—one at each end of the cap—also two levers to move said guides, and two eccentric-wheels, one arm in the center of the cap at right angle with the top of the cap, as represented by Fig. 9. Figs. 4 and 8 represent the guide, lever, eccentric-wheel, points, and their connection with each other. The extended side view of the arm and end view of cap, and by the different position in which the machinery is placed, is intended to represent its action. As stated before, two sets of the guide, lever, eccentric-wheel, points, and their connections are required, one at each end of the cap, the wheels each side of the crank.

What I claim as my invention, and desire to secure by Letters Patent, is—

The method herein described of gathering and thrashing grain at the same time by means of the revolving rods or oscillating or revolving cap constituting the gatherer, in combination with the thrasher and concave, the whole being constructed and operating substantially in the manner set forth.

A. CHURCHILL.

Witnesses:
SAMUEL PLATT,
NEHEMIAHA PLATT.